June 6, 1961 J. M. SLATER 2,986,944
INDUCTION GYROSCOPE TORQUER AND RELATED GYROSCOPIC APPARATUS
Filed Dec. 16, 1959 3 Sheets-Sheet 2

INVENTOR.
JOHN M. SLATER
BY Allan Rothenberg
ATTORNEY

June 6, 1961  J. M. SLATER  2,986,944
INDUCTION GYROSCOPE TORQUER AND RELATED GYROSCOPIC APPARATUS
Filed Dec. 16, 1959  3 Sheets-Sheet 3

INVENTOR.
JOHN M. SLATER
BY *allan Rothenberg*
ATTORNEY

United States Patent Office

2,986,944
Patented June 6, 1961

2,986,944
INDUCTION GYROSCOPE TORQUER AND RELATED GYROSCOPIC APPARATUS
John M. Slater, Fullerton, Calif., assignor to North American Aviation, Inc.
Filed Dec. 16, 1959, Ser. No. 859,958
9 Claims. (Cl. 74—5.4)

This invention relates to torquers for generating precision torques in gyroscopes, and particularly concerns torquers making use of forces due to the interaction of eddy currents, induced in a conductor by a magnetic field rotating relative to the conductor, with the field itself. This invention further relates to gyroscopic apparatus incorporating gyroscopes which utilize this type of torquer.

The gyroscope torquer is a device for producing a torque on the gyroscope, usually about the output axis in the case of a single-axis gyro. In normal use, it therefore tends to precess the gyroscope about its input axis. One widely used present-day device for producing this torque comprises a permanent magnet and a coil movably mounted within the magnetic field of the magnet. Direct currents proportional to the torque desired to be imparted to the gyroscope are applied to the coil. Magnetic flux generated by these currents interacts with the flux of the magnet to produce the desired torque. An example of this type of torquer is shown in the patent application entitled, Flotation Gyroscope, Serial No. 259,192, filed November 30, 1951, by J. M. Slater et al. and assigned to North American Aviation, Inc., assignee of the present invention. Until recently, this type of torquer has been of adequate precision as a torquing device. However, the state of development of the other structural elements included in a precision gyroscope has advanced so that at present the coil and magnet torquer may well set the limit on gyroscope accuracy.

Certain structural complications of the prior art coil and magnet torquer are avoided in an improved gyroscope torquer. For example, the coil and magnet torquer requires lead-in wires to the gyroscope flotation gimbal and a magnetic field generating element (coil) upon the flotation gimbal. The presence of such lead-in wires and magnetic field on the flotation gimbal can cause coercion (of an erratic nature) of the float to the gyroscope case.

Prior art torquing devices are oftentimes of unsymmetrical design as viewed from the gyroscope output axis. In a liquid flotation gyroscope this type of structure may cause undesirable liquid viscous or windage effects and is, therefore, undesirable.

The prior art gyroscope torquers also have critical mechanical tolerances with the undesirable corollary that the assembly of the torquer structure is difficult and expensive.

A usual requirement of gyroscope torquers not obtainable with all presently available types is that they be operable in response to pulsed digital signals derived from a digital computer, digital acceleration sensing device or other device having a digital output.

Present day gyroscope torquer designs have additional limitations. It is difficult to provide a torquer in which selectively variable torque magnitudes may be obtained during the manufacture of the gyroscope. Also, it is difficult to provide a scale factor adjustment. Furthermore, in contemporary torquers it is difficult to effect compensation for changes in environmental temperature.

Current gyroscopic apparatus such as stable platforms for inertial autonavigators and Schuler tuned gyro pendulums often use integrating inertial accelerometers known in the art as distance meters. Gyroscopes incorporating the torquer of this invention greatly simplify such gyroscopic systems since they eliminate the necessity for precision voltage supplies, capacitive tachometers and other apparatus presently required for precisely torquing the gyroscope in accordance with the distance meter output signals.

It is, therefore, an object of this invention to provide a gyroscope torquer having a higher accuracy than other torquers presently known in the art.

It is another object of this invention to provide a gyroscope torquer which operates in response to digital input signals.

It is still another object of this invention to provide a gyroscope torquer which requires no lead-in wires to the gyro float.

A further object of this invention is to provide a gyroscope torquer which does not require electrical coils or windings.

Another object of this invention is to provide a gyroscope torquer which does not require a direct current or permanent magnet field on the gyroscope float.

It is another object of this invention to provide a gyroscope torquer which does not utilize a variable magnitude magnetic field, thereby avoiding problems arising from hysteresis of the core material.

It is still another object of this invention to provide a gyroscope torquer of symmetrical figure-of-revolution design so as to avoid liquid viscous or windage effects.

A further object of this invention is to provide a gyroscope torquer having relatively low mechanical tolerances.

Another object of this invention is to provide a gyroscope torquer which is easily assembled during manufacture thereof.

It is another object of this invention to provide a gyroscope torquer in which predetermined torque magnitudes may easily be built into the gyroscope during manufacture thereof.

It is still another object of this invention to provide a gyroscope torquer which is easily provided with a scale factor adjustment.

A further object of this invention is to provide a gyroscope torquer in which temperature compensation is easily obtainable.

Another object of this invention is to provide a gyroscope torquer which is non-critical in regard to alignment.

It is still another object of this invention to simplify gyroscopic systems employing distance meters.

A further object of this invention is to provide a gyroscopic torquing system which does not require precision voltage supplies.

Another object of this invention is to provide a gyroscopic torquing system which does not require capacitive tachometers.

It is still another object of this invention to provide a gyroscope torquer which may function as a differentiator.

Other and further objects, features and advantages of the invention will become apparent as the description proceeds.

Briefly, in accordance with a preferred form of the present invention, a conductive member is affixed to the gyroscope float in a position such as to have an effective radius or moment arm relative to the gyro output axis. A magnet rotatably mounted (on the instrument base) adjacent the conductive member induces eddy currents in the conductive member upon rotation thereof. The reaction between these currents and the magnetic field of the magnet generates a torque applied to the gyroscope which is proportional to the speed of rotation of the magnet. With an input in the form of a (varying) shaft displacement, the device is both a differentiator and torquer since it provides a torque about the gyro torquing axis which is accurately proportional to the first time derivative (angular velocity) of the input (angular displacement). In one embodiment of the gyroscopic apparatus, the magnets may be synchronously driven from the rotor of a distance meter thereby considerably simplifying gyroscopic systems employing distance meters.

A more thorough understanding of the invention may be obtained by study of the following detailed description taken in connection with the accompanying drawings in which.

Figure 1:
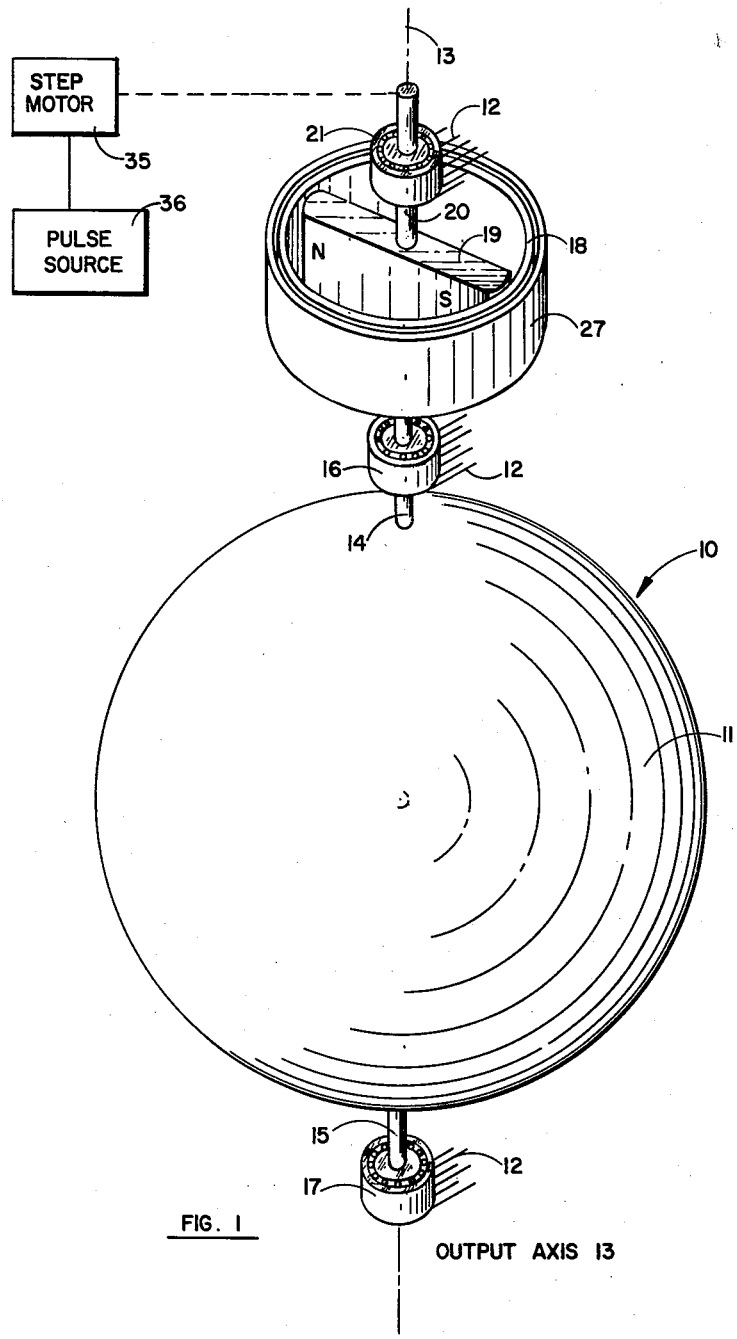
FIG. 1 is a view in perspective of one embodiment of this invention.
Figure 3:
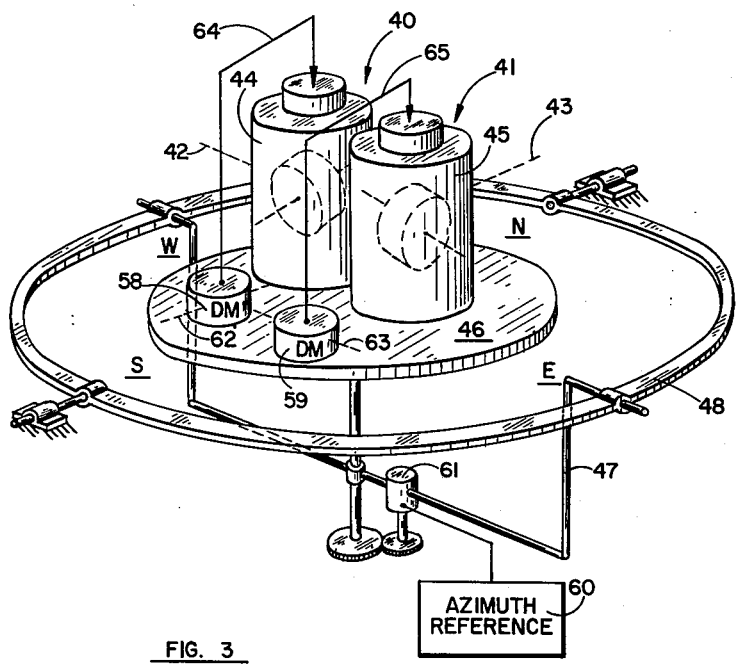
FIG. 3 illustrates a Schuler-tuned vertical reference which incorporates this invention.

Referring now to FIG. 1, illustrated in a perspective view are the basic elements of a gyroscope torquer constructed in accordance with this invention. A gyroscope shown generally at 10 includes a spherical gimbal or case 11 mounted for pivotal motion within a support shown generally at 12. The gyroscope rotor (not shown) is mounted within the gimbal 11 for rotation about the gyro spin axis. The axis 13 transverse to the spin axis, about which the gimbal 11 is allowed to rotate, is known in the art as the gyroscope output or torquing axis. Shafts 14 and 15 fixed to gimbal 11 are aligned with the output axis 13 and are mounted in bearings 16 and 17 affixed to the support 12. The gyro is isolated from angular movements of the craft upon which it is carried by fixing its support 12 to a platform or frame which is mounted to the craft with three degrees of angular freedom as illustrated in Fig. 3. Thus, gyro precessional angular velocities are of the order of not more than several times earth-rate (fifteen degrees per hour). For purposes of illustration, the bearings are shown as ball bearings; this type of bearing is satisfactory for relatively low precision gyroscopes. However, for high precision gyroscopes, low-friction fluid bearings are preferred.

In certain types of gyroscope apparatus, it is necessary to precisely torque the gyroscope about its torquing axis so as to precess the gyroscope about its input or space-reference axis at a rate sufficient to maintain a selected orientation. For example, a stationary gyroscope must acquire a rotational velocity about its space reference axis which is a function of latitude and the rotational velocity of the earth merely in order to maintain a fixed orientation of such space reference axis with relation to the earth. So too, upon traverse of the gyro over the earth, space-reference axis rotation must also be imparted in accordance with the range angle of such traverse if a local earth level orientation is to be maintained.

A new and unique torquer for accomplishing this result includes a cylindrical conductive member 18 directly attached symmetrically to the end of the gimbal 11. For this purpose, the lower end of the cylinder 18 may be closed and attached at the center to shaft 14. The connection between the conductive member 18 and float or gimbal 11 is preferably made with a non-conductive material in order to minimize electrical conduction between the member 18 and the gimbal. Alternatively, a number of perforations may be provided in the lower end of member 18 for this purpose. Conductive member 18 is preferably non-magnetic, and is made of a material such as Manganin or Constantan, for example, having a low temperature resistivity coefficient. A magnet 19 is mounted within the conductive cylinder 18 so that its poles are closely adjacent the inner surfaces thereof. Fixed to the magnet is a shaft 20 which is mounted for rotation within a bearing 21 so that the magnet 19 may be rotated with respect to the support 12 and cylinder 18. A flux ring 27 is affixed to the gyro support 12 and surrounds the cylinder 18. Because of the close proximity of magnet 19 with cylinder 18, the magnetic flux caused by the magnet passes from one pole of the magnet through the walls of the cylinder returning to the other pole of the magnet through flux ring 27. As the magnet is rotated with respect to the cylinder 18, induction occurs producing electromotive forces (E.M.F.) over incremental lengths of the conductive walls of the cylinder. This E.M.F. produces electric currents in the conductive cylinder walls; these currents react with the magnetic flux of the magnet to produce forces on the cylinder causing a drag torque about the axis 13. Under normal operating conditions this torque is very accurately proportional to the speed of rotation of the magnet 19 with respect to the cylinder 18; that is to say, linear to one part in 100,000 or better. To be sure, non-linearity can occur at very high magnet speeds and torques, but such conditions are ordinarily absent in precision gyroscopic systems. Since the angular velocity of the magnet is that of shaft 20, the latter may be driven by any suitable rotating device to obtain precession velocity precisely proportional to the velocity of shaft 20.

A particular advantage of the torquer shown in Fig. 1 is that it operates as a digital torquer, that is, rotating the magnet 19 through an angle $\theta$ causes the gyro to precess through an angle $M\theta$ where $M$ is ordinarily arranged to be on the order of $10^{-5}$ or $10^{-6}$. Thus, the device may be driven directly from digital signals by connecting the shaft 20 to a stepping motor 35 energized from pulse source 36. For each input pulse, the stepping motor rotates magnet 19 through a predetermined angle and thus precesses the gyro through a predetermined angle proportional thereto.

Other advantages of the torquer are also readily apparent from the simplified schematic of FIG. 1. No lead-in wires are required to the gyroscope gimbal 11, nor does the torquer require any coils or windings. The cylindrical member 18 is perfectly symmetrical about the output axis and does not introduce error causing windage effects. Also, the member (18) which is attached to the gyro gimbal is of very simple rigid configuration.

By suitably proportioning the magnetic gap and the diameter of the magnet, and using a flux ring 27 of low expansion material such as Invar, the decrease in gap upon thermal expansion of the magnet can be made to compensate for the decrease in magnetic field strength with temperature. With such an arrangement, compensation of magnet field strength variation is substantially perfect (that is, within one part in $10^5$ or better) over a temperature range of one or two degrees centigrade. Since the Manganin conductor has a negligible temperature coefficient (less than one part in $10^5$ per degree centigrade) the induction torquer may be regarded as completely temperature compensated for any given small temperature range.

Figure 2:
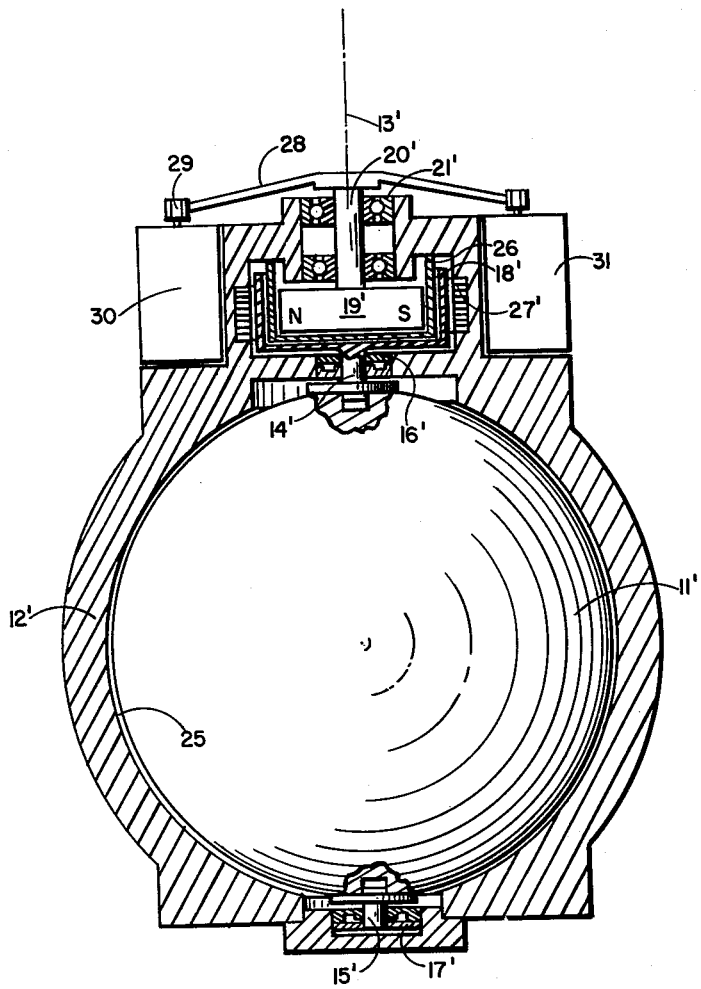
FIG. 2 shows an elevation cross-section of a complete gyroscope which incorporates the torquer of this invention.

The torquer of this invention is applicable to many types of gyroscopes. An illustration of this torquer applied to a flotation gyroscope is illustrated in FIG. 2. The gyroscope shown is constructed in accordance with the patent application noted above and entitled Flotation Gyroscope. For convenience, those elements which are analogous to structural elements of FIG. 1 bear primes of the corresponding identification numerals. Thus, gimbal 11' of FIG. 2 is a spherical gimbal float or case containing a conventional rotor and drive motor. The gyro rotor speed is accurately controlled so that the angular momentum, $H$, of the rotor is constant. Low-friction fluid bearings define the gyroscope torquing axis 13' and include stub shafts 14' and 15' attached to opposite ends of the float 11'. The stub shafts rotate with respect to the gyro support 12' upon fluid bearings 16' and 17'. The interior of the gyroscope support 12' (between the latter and float 11') is provided with flotation fluid 25 comprising some relatively non-corrosive dense fluid. A fluid known in the art and commonly used for this purpose is Fluorolube. The flotation supporting force for the flotation gimbal 11' is derived from the quantity of fluid 25 displaced by the weight of gimbal 11'. The volume of the gimbal is therefore made to be suitably related to the weight of the gimbal and its contents, so that the gimbal and its contents will have an average density substantially equal to the density of the fluid. As a consequence, the fluid bearings 16' and 17' are required only to support a small residual unbuoyed load. The fluid bearings and flotation system is actuated by means of an externally attached fluid pump (not shown) which circulates the fluid under proper pressure and flow conditions.

The torquer of this invention applied to the gyroscope of FIG. 2 includes a conductive non-magnetic cylindrical cup 18' attached to stub shaft 14' so as to be located symmetrically at the end of the gimbal float 11'. Magnet 19' is carried for rotation about the central axis of the cylindrical cup 18' by means of shaft 20' which is mounted for rotation in ball bearing 21'. A thin cylindrical septum 26 confines the liquid within the gyroscope support 12'. Although it might appear that excessive magnetic flux losses would result if this septum member were constructed of an electrically conductive material, it has been found that such is not the case. Therefore, any suitable non-magnetic material may be utilized, an example being aluminum. The septum 26 should be, however, as thin as possible so as to allow the poles of magnet 19' to extend as closely as possible to the inner surface of the conductive cup 18'. An outer cylindrical flux ring 27' of magnetically permeable material is fixedly mounted to and within the gyroscope support 12' and serves to complete the magnetic circuit.

Magnet 19' is coupled by rotatably mounted shaft 20' to a gear 28 affixed thereto. The teeth of this gear engage with a pinion gear 29 connected to the shaft of motor 30. Motor 30 may be one of several forms known in the art and the type used will be prescribed by the system within which the gyroscope is being used. For example, the motor 30 can be a self-synchronous motor run by a remote generator, in which case a count of generator revolutions will give a measure of applied torque impulse. Motor 30 can also be of a non-synchronous type in which case a two-phase resolver 31 would be preferably included and driven by the gear 28 so as to count the magnet revolutions.

In a digital system, the motor 30 would be operable from digital input signals and, as illustrated in FIG. 1, would take the form of stepping motor 35 connected to drive shaft 20' and being driven through a predetermined angle of rotation for each pulse input supplied thereto from the digital source 36 of precession commanding pulses. Thus, the total input axis precession experienced by the gyro at any time is precisely proportional to the total number of pulses produced by the digital source 36.

Many systems known and used today embody torqued gyroscopes. The invention herein described may be of particular utility when incorporated in a complete inertial navigator of the type having a digital computer for generating signals in digital form which define the necessary corrections for the distance meters, velocity meters or the like, of the system. Such computer signals also define the necessary corrective torques to be applied to the gyros which control the stable platform upon which are mounted the distance or velocity meters of the navigation system. In such a system, computed gyro inputs are most conveniently available as discrete digital pulses whereby the above-described torquer may be uniquely incorporated in the system by virtue of the fact that it is peculiarly suited to accept torque commands in digital form. While the invention is of utility in many different types of systems, a major advantage obtained by the shaft rotation input of this torquer will be described in connection with a specific system, a Schuler tuned vertical reference, which is somewhat simpler than a complete inertial navigator.

An ideal vertical reference system would take the form of a Schuler pendulum, a simple physical pendulum tuned to a period $T = 2\pi (R/g)^{1/2} = 84$ minutes where R is earth radius and g is the acceleration of gravity. Such a pendulum once set vertical at take-off point, for example, would preserve verticality despite any acceleration which it may experience in traverse over the earth. A Schuler pendulum can be mechanized indirectly with the aid of one or more gyros in conjunction with integrating accelerometers and feedback circuits. In such an arrangement, components of acceleration experienced by the accelerometers are detected and integrated. The integrated value is divided by earth radius R and fed back as the control torque to the gyro. The patent to Vacquier, No. 2,835,132, describes one such artificial Schuler-tuned pendulum utilizing a two-axis gyro. Assuming perfection of all of the components, the device of this patent would behave exactly like a Schuler pendulum of 84-minute period.

In a double axis gyro, two axes may each be both output and input axes. Such an arrangement includes an "input" axis which may be termed the space reference axis and an "output" axis which may be termed the torquing axis. The present invention may be applied to a double-axis gyro such as that shown by the Vacquier patent, but application to single-axis gyros is somewhat simpler, and such a system will be described. As illustrated in FIG. 3, a pair of single-axis gyros 40 and 41, each of which may be identical to that illustrated in FIG. 2, having mutually orthogonal input axes 42 and 43, and have their supports 44 and 45, similar to support 12' of FIG. 2, fixedly secured to a table or platform 46. The table 46 is universally gimbaled, being mounted for three degrees of angular freedom in the vehicle which carries the reference system. Thus, the table is pivoted about a vertical axis in an inner gimbal 47, which in turn is pivoted about a horizontal east-west axis, for example, in an outer gimbal 48. Gimbal 48 is pivoted in the carrying vehicle on a second horizontal axis which is north-south in the described arrangement. The platform is stabilized in azimuth in a manner similar to that shown in the Vacquier patent by means of an azimuth reference device such as gyro compass 60 which is arranged to control the azimuth orientation of the azimuth platform 46 by means of a suitable connection to driving motor 61 secured to the gimbal 47.

The table carries a pair of double integrating acceleration sensing devices, commonly known as distance meters, which have mutually orthogonal and horizontal sensing axes 62, 63. These distance meters are typically of the type described in Patent No. 2,882,034, of J. M. Wuerth, and are constructed and arranged so as to produce a total output shaft displacement proportional to the second time integral of sensed acceleration (distance).

Note that the artificial Schuler pendulum requires input axis precession velocity of its gyro or gyros which is precisely proportional to the first time integral of sensed acceleration which is, of course, the velocity of traverse over the earth. The torquer of the present invention, as described above, produces an inlet axis precessional velocity in response to an angular velocity input thereto. With a precision acceleration sensing and double-integrating device of the type shown in the Wuerth patent, there is produced an output shaft velocity precisely proportional to the first time integral of acceleration whereby it will be seen that the output of this sensing instrument is exactly of the type accepted by the torquer of this invention. The torquer itself in effect differentiates the shaft displacement output of the distance meter. Thus, the rotors of the acceleration sensing devices 58, 59 may be directly servo linked to the rotating magnets of the respective gyro torquers, as by servo links schematically depicted at 64, 65. The system operates as if the torquer magnets were connected to the distance meter rotors by flexible shafts. The magnet angular velocity is proportional to the first time integral of acceleration whereby upon selection of a proper scale factor (the driving ratio between distance meter rotor speed and magnet speed) this integral is divided by earth radius R and the desired proportional torque is applied to the gyro to obtain an artificial Schuler tuned system of high precision. It is to be understood, of course, that the platform 46 is maintained level under the control of the gyroscopes by means of conventional gimbal servo systems responsive to pickoffs on the gyros. Since this arrangement for stabilizing platforms from a double axis gyro or from a pair of single axis gyros is well known to those skilled in the art, no detailed description thereof is believed to be necessary.

Figure 4:
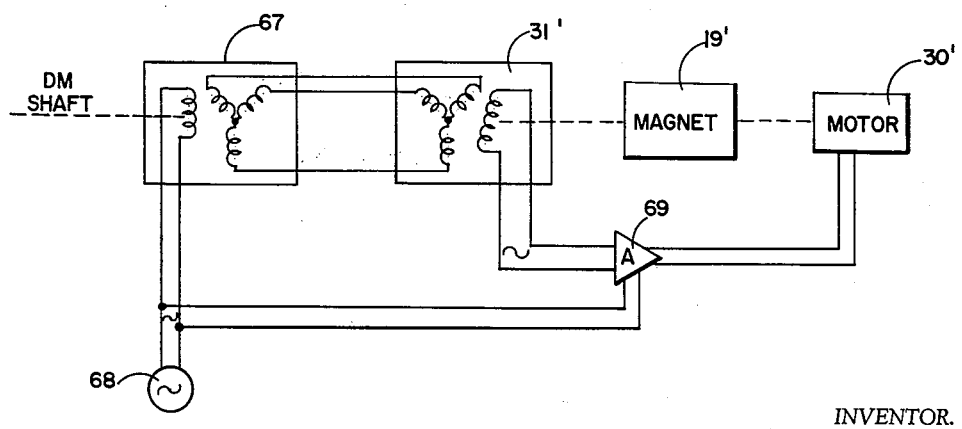
FIG. 4 illustrates certain exemplary details of the system of FIG. 3.

Of course, many types of servo systems for linking the distance meters and torquer magnets will readily suggest themselves to those skilled in the art. For the purposes of exposition, there is described an exemplary servo illustrated in FIG. 4. The rotor of the distance meter of the Wuerth patent is connected to drive the rotor of a three-phase synchro 67 which is substituted for the generator 15 of the Wuerth patent. The three-phase stator of synchro 67 is electrically connected to the three-phase stator of a second synchro 31' which is positioned and arranged as a substitute for the two-phase resolver 31 (FIG. 2). The rotor of synchro 67 is energized from a source 68 while the signal from the rotor of synchro 31' is connected to drive an amplifier demodulator 69 which is phase referenced from the source 68. Amplifier 69 drives the motor 30', in this arrangement positioned as and substituted for the motor 30 of FIG. 2. Thus, the motor 30' effects rotation of the magnet 19' and also rotates the rotor of synchro 31' whereby the rotation of the magnet 19 is precisely controlled in proportion to the rotation of the rotor of the distance meter.

The arrangement of FIG. 3 provides a system capable of accuracy much greater than that of prior systems such as that of the Vacquier patent, for example, and at the same time provides for greatly simplified construction by elimination of lead-in wires, electrical windings, magnetic elements on the floats, and other features previously described. In particular, precision voltage control on the order of 0.01 percent would be required in a device such as that of Vacquier. No such precision voltage reference is required in the described arrangement whereby a major practical disadvantage of alternating-current voltage control is obviated.

It will be seen that the gyro torquer is not only of greatly improved accuracy as compared to other functionally similar devices, but at the same time is specifically arranged to accept and differentiate an input from a high precision acceleration sensing instrument and also to accept a digital input. Thus, the provision of this torquer on a gyroscope provides a number of new and unexpected improvements when incorporated in several different types of systems.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a gyro having a case member mounted on a support member for pivotal motion in a bearing defining a torquing axis which is substantially normal to a space-reference axis thereof and means mounting said support member for isolation from angular motion, apparatus for effecting precession of said gyro in proportion to a precession commanding shaft rotation comprising a conductive element directly fixed to one of said members at an effective moment arm relative to the torquing axis, magnetic means on the other of said members for producing a magnetic field in and about said element whereby motion of said field relative to said element produces eddy current torque on said one member acting about said torquing axis, and means for controlling said magnetic means from said commanding shaft rotation to effect motion of said field relative to said element in proportion to said precession commanding shaft rotation whereby said gyro obtains a precession velocity about its space-reference axis proportional to the velocity of said shaft rotation.

2. In a gyro having a case member mounted on a support member for pivotal motion in a bearing defining a torquing axis which is substantially normal to a space-reference axis thereof, apparatus for effecting precession of said gyro in proportion to a number of precession commanding digital pulses comprising a conductive element fixed to one of said members, magnet means rotatably mounted on the other of said members for producing a magnetic field in and about said element whereby rotation of said magnet means relative to said element produces eddy current torque on said one member acting about said torquing axis, and means for effecting a predetermined amount of rotation of said magnet means for each said digital pulse whereby said gyro obtains a precession velocity about its space-reference axis proportional to the number of said digital pulses.

3. A support, a gyro rotor, a gimbal rotatably mounting said rotor about a spin axis thereof and journalled in said support about a second axis normal to said spin axis, means mounting said support for isolation from angular motion, opposed relatively rotatable conductor and magnet members, one of said members being directly fixed to said gimbal, the other of said members being mounted on said support, a source of electrical pulses, and means responsive to said source for effecting a predetermined angle of rotation of said magnet member for each said pulse from said source.

4. In a gyro having a gimbal journalled to a support about a gyro torquing axis, a digital torquer for precessing said gyro about a space-reference axis thereof in accordance with a digital input signal comprising: a conductive member fixed to said gimbal, magnetic means carried by said support for producing a magnetic field in and about said conductive member and rotating relative thereto, and means responsive to said digital input signal and coupled with said magnetic means for effecting rotation of said field in an amount proportional to said digital input signal.

5. In a gyro having a gimbal journalled to a support about a gyro torquing axis and means for isolating said support from angular movement, a digital torquer for precessing said gyro about a space-reference axis thereof in accordance with a number of digital input pulses comprising: a conductive member fixed to said gimbal, magnet means rotatably mounted on said support for producing a magnetic field in and about said conductive member and rotating relative thereto, a stepping motor on said support and connected to rotate said magnetic means, said stepping motor being responsive to said input pulses to effect a predetermined amount of angular rotation of said magnet means for each input pulse.

6. An attitude reference system comprising a universally gimballed platform, a gyro having a gimbal journalled on said platform about a torquing axis of said gyro and having a rotor journalled in said gimbal, a conductive member fixed to said gimbal, a magnet journalled on said platform for rotation in close proximity to said member, an integrating acceleration responsive device on said platform producing an output having an angular displacement proportional to the second integral of acceleration, and drive means responsive to said device for effecting angular velocity of said magnet in accordance with the first derivative of angular displacement of said output.

7. The system of claim 6 wherein said acceleration responsive device includes a rotating element having an angular displacement proportional to the second integral of sensed acceleration, said drive means comprising a motor on said platform connected to rotate said magnet, and means coupled between said rotating element and said motor for driving said motor at an angular velocity proportional to the first derivative of angular displacement of said rotating element.

8. An attitude reference system comprising a universally gimballed platform, a gyro having a gimbal journalled on said platform about a torquing axis of said gyro and having a rotor journalled in said gimbal, a conductive member fixed to said gimbal, a magnet journalled on said platform for rotation in close proximity to said member, a doubly integrating acceleration responsive device on said platform including a rotor having an angular displacement proportional to the second integral of acceleration, and servo means having an input from the rotor of said device for effecting angular velocity of said magnet in proportion to the first derivative of angular displacement of the rotor of said acceleration responsive device.

9. A gyro comprising a support, means mounting said support for three degrees of angular freedom so that gyro precessional velocities are not more than a few times the velocity of earth rotation, a gimbal journalled in said support for rotation about an output axis of said gyro, a rotor journalled in said gimbal, a magnetic flux return ring fixed to said support and axially centered on said output axis, a magnet symmetrical about said output axis and journalled on said support for rotation about said output axis in close proximity to said ring, an annular conductive sleeve directly fixed to said gimbal and symmetrically situated concentrically with and between said magnet and ring, and a motor on said support connected to rotate said magnet at a predetermined rate so as to apply to said gyro about said output axis a control torque precisely proportional to said predetermined rate.

References Cited in the file of this patent

UNITED STATES PATENTS

| | | |
|---|---|---|
| 2,811,043 | Bonnell | Oct. 29, 1957 |
| 2,819,053 | Pope | Jan. 7, 1958 |
| 2,846,888 | Mosier | Aug. 12, 1958 |
| 2,900,825 | Echolds et al. | Aug. 25, 1959 |